United States Patent
Omata et al.

(10) Patent No.: US 9,422,904 B2
(45) Date of Patent: Aug. 23, 2016

(54) VEHICLE ENGINE STARTING APPARATUS

(75) Inventors: Shigehiko Omata, Hitachinaka (JP);
Shigenori Nakazato, Hitachinaka (JP);
Norio Yanagawa, Hitachinaka (JP);
Shingo Kitajima, Hitachinaka (JP);
Atsushi Saeki, Hitachinaka (JP);
Yoshiaki Nagasawa, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 430 days.

(21) Appl. No.: 13/979,978

(22) PCT Filed: Feb. 21, 2012

(86) PCT No.: PCT/JP2012/054164
§ 371 (c)(1),
(2), (4) Date: Nov. 14, 2013

(87) PCT Pub. No.: WO2012/124441
PCT Pub. Date: Sep. 20, 2012

(65) Prior Publication Data
US 2014/0053684 A1    Feb. 27, 2014

(30) Foreign Application Priority Data

Mar. 11, 2011  (JP) .................... 2011-054562

(51) Int. Cl.
*F02N 11/00* (2006.01)
*F02N 11/08* (2006.01)
(Continued)

(52) U.S. Cl.
CPC ........... *F02N 11/00* (2013.01); *F02N 11/0844* (2013.01); *F02N 11/0848* (2013.01);
(Continued)

(58) Field of Classification Search
CPC ............ Y10T 74/137; F02N 11/0855; F02N 11/108; F02N 2200/048; F02N 2300/2002
See application file for complete search history.

(56) References Cited

U.S. PATENT DOCUMENTS 4,319,139 A * 3/1982 Mazzorana ............. F02N 15/06
290/38 C
4,543,923 A * 10/1985 Hamano .................. F02N 5/04
123/179.25
(Continued)

FOREIGN PATENT DOCUMENTS

JP  56-42437     10/1981
JP  4214401 B2   1/2009
(Continued)

OTHER PUBLICATIONS

PCT International Search Report and Written Opinion on application PCT/JP2012/054161 mailed May 22, 2012; 4 pages.

*Primary Examiner* — David M Fenstermacher
(74) *Attorney, Agent, or Firm* — Foley & Lardner LLP

(57) ABSTRACT

Vehicle engine starting apparatus of automatically restarting an engine by quickly responding to a subsequent engine restart request even if engagement of a pinion gear with a ring gear is failed in the process of a stop of the engine. Pinion gear is displaced such that the pinion gear is engaged with the ring gear at a timing (when rotation speed of the pinion gear and rotation speed of the engine are nearly synchronized with each other with a signal from a control device when a predetermined condition is met. Where an engagement sensor has transmitted a signal "H" indicating engagement failure, when restart of the engine becomes necessary, the pinion gear is displaced toward a ring gear side by the control device.

7 Claims, 3 Drawing Sheets

CASE OF ENGAGEMENT SUCCESS

(51) Int. Cl.
*F02N 11/10* (2006.01)
*F02N 15/02* (2006.01)
*F02N 15/06* (2006.01)

(52) U.S. Cl.
CPC .......... *F02N11/0855* (2013.01); *F02N 11/087* (2013.01); *F02N 11/0818* (2013.01); *F02N 11/108* (2013.01); *F02N 15/022* (2013.01); *F02N 15/067* (2013.01); *F02N 2200/022* (2013.01); *F02N 2200/041* (2013.01); *F02N 2200/047* (2013.01); *F02N 2200/048* (2013.01); *F02N 2300/2002* (2013.01); *F02N 2300/2011* (2013.01); *Y02T 10/48* (2013.01); *Y10T 74/137* (2015.01)

(56) References Cited

U.S. PATENT DOCUMENTS

| | | | | |
|---|---|---|---|---|
| 4,586,467 A | * | 5/1986 | Raver | F02N 11/087 123/179.3 |
| 4,774,915 A | * | 10/1988 | Nguyen | F02N 11/0851 123/179.25 |
| 5,713,320 A | * | 2/1998 | Pfaff | F02N 11/006 123/179.3 |
| 5,963,890 A | * | 10/1999 | Sarbach | B60H 1/00978 219/202 |
| 6,651,603 B2 | * | 11/2003 | Osada | F02N 11/0814 123/179.3 |
| 8,439,006 B2 | * | 5/2013 | Laubender | F02N 15/065 123/179.4 |
| 8,714,037 B2 | * | 5/2014 | Moriya | F02N 11/0844 123/179.3 |
| 2001/0006292 A1 | * | 7/2001 | Inaba | F02N 11/04 290/38 R |
| 2004/0149247 A1 | * | 8/2004 | Kataoka | F02N 11/006 123/179.4 |
| 2009/0314133 A1 | * | 12/2009 | Atluru | F02N 15/063 74/7 R |
| 2010/0264670 A1 | | 10/2010 | Usami et al. | |
| 2010/0269630 A1 | * | 10/2010 | Niimi | F02N 15/023 74/7 C |
| 2011/0056450 A1 | | 3/2011 | Notani | |
| 2012/0139263 A1 | * | 6/2012 | Weinum | F02N 11/0851 290/38 R |
| 2012/0210811 A1 | * | 8/2012 | Nishioka | F02N 11/0851 74/405 |
| 2012/0247270 A1 | * | 10/2012 | Ikemori | F02N 11/087 74/7 E |
| 2012/0312123 A1 | * | 12/2012 | Niimi | F02N 11/0855 74/7 E |
| 2012/0318227 A1 | * | 12/2012 | Hashimoto | F02N 11/0855 123/179.3 |
| 2013/0041572 A1 | * | 2/2013 | Cwik | F02N 11/0855 701/113 |
| 2013/0081514 A1 | * | 4/2013 | Abe | F02N 11/0855 74/7 C |
| 2013/0173142 A1 | * | 7/2013 | Kato | F02D 29/02 701/112 |
| 2014/0053684 A1 | * | 2/2014 | Omata | F02N 11/0855 74/7 E |
| 2014/0278020 A1 | * | 9/2014 | Neet | F02N 11/087 701/112 |
| 2015/0219058 A1 | * | 8/2015 | Kato | F02N 11/0851 701/113 |
| 2015/0219059 A1 | * | 8/2015 | Fujita | F02N 11/0855 290/38 R |

FOREIGN PATENT DOCUMENTS

| | | |
|---|---|---|
| JP | 2010-190226 | 9/2010 |
| JP | 2011-001947 | 1/2011 |
| JP | 2011-074912 | 4/2011 |
| JP | 2011-094513 | 5/2011 |

\* cited by examiner

CASE OF ENGAGEMENT SUCCESS

CASE OF ENGAGEMENT FAILURE

VEHICLE ENGINE STARTING APPARATUS

TECHNICAL FIELD

The present invention relates to a vehicle engine starting apparatus.

BACKGROUND ART

Typically, when a vehicle drives in urban areas, the vehicle may stop at an intersection, at a crossing, and the like. In such a case, if the engine is kept idled, the fuel is wasted, and the fuel consumption is increased.

Therefore, there is an automatic stopping/restarting apparatus, which automatically stops the engine of the vehicle even during driving, cuts the fuel consumption during the temporary stop of the vehicle when a condition of stop of the engine is met, and automatically restarts the engine afterwards when a predetermined condition is met during the vehicle is stopped.

In restarting the engine, a pinion gear, which transmits power of a starter to the engine in order to crank the engine, is pushed by a solenoid coil, and the pinion gear is engaged with a ring gear coupled with an engine cranking shaft, so that the engine is cranked and restarted with the power of the starter.

Here, in the engine automatic stopping/restarting apparatus, when a quick restart is requested, prompt restart of the engine is required responding to the restart request of the driver.

However, in the above-described vehicle engine automatic stopping/restarting apparatus, typically, the pinion gear is pushed and is engaged with the ring gear after the engine rotation goes into a stopped state, and even if a restart request occurs during a drop of the engine rotation in the process of a stop of the engine, restart cannot be performed until the engine rotation goes into the stopped state, and therefore, a time delay occurs by the restart is performed.

Therefore, PLT 1 discloses a technology wherein, when a restart request occurs during a drop of the engine rotation in the process of a stop of the engine, the starter is energized to idle the pinion gear, rotation speeds of the pinion gear and the ring gear are respectively detected, and the pinion gear is pushed to be engaged with the ring gear at a timing when the rotation speeds of the pinion gear and the ring gear are synchronized with each other, and the engine is promptly restarted.

CITATION LIST

Patent Literature

PLT 1: Publication of U.S. Pat. No. 4,214,401

SUMMARY OF INVENTION

Technical Problem

In the above-described previous technology, in a case where a restart request occurs during the drop of the engine rotation in the process of a stop of the engine, a prompt restart is attempted in starting the engine, by energizing the starter and idling the pinion gear, detecting the rotation speeds of the pinion gear and the ring gear, and pushing the pinion gear to be engaged with the ring gear at the timing when the rotation speeds are synchronized with each other. At this time, there is no problem if the pinion gear is reliably engaged with the ring gear. However, there may be a case where the engagement of the pinion gear with the ring gear is failed.

However, the technology disclosed in PLT 1 does not consider such a case where the pinion gear fails the engagement with the ring gear.

Therefore, in an engine restart operation when the pinion gear fails the engagement with the ring gear, not only the engine cannot be quickly restarted, but also the pinion gear is just idled, and the engine cannot be automatically restarted. In this case, the driver needs to manually perform the restart operation of the engine.

Also, when an engine restart request occurs after the vehicle and the engine are stopped after the starter is energized to push the pinion gear to be engaged with the ring gear during a drop of the engine rotation in the process of a stop the engine, there may be a case where the engagement of the pinion gear with the ring gear is failed.

In this case, at starting the engine, it is necessary to energize the starter after the pinion gear is pushed toward a ring gear side, and the pinion gear is engaged with or pushed toward the ring gear. The driver in this case is required to perform a different operation from the case where the pinion gear is engaged with the ring gear before the start of the engine. However, it is difficult for the driver to judge that the pinion gear is not engaged with the ring gear, and therefore, the engine cannot be promptly started.

An object of the present invention is to realize a vehicle engine starting apparatus capable of automatically restarting an engine by quickly responding to a subsequent engine restart request even if engagement of a pinion gear with a ring gear is failed in the process of a stop of the engine.

Solution to Problem

To achieve the above-described object, the present invention is configured as follows:

A vehicle engine starting apparatus, in which a pinion gear mounted to a starter motor is engaged with a ring gear of a crank shaft of an engine, and the starting motor rotates the pinion gear to start the engine, is provided with a pinion gear displacement means that causes the pinion gear to move closer to/to separate from the ring gear, an engagement detection means that detects whether the pinion gear has been engaged with the ring gear, and a control means that controls operations of the pinion gear displacement means and of the starter motor based on an engagement detection signal from the engagement detection means.

Advantageous Effects of Invention

According to the present invention, a vehicle engine starting apparatus capable of automatically restarting an engine by quickly responding to a subsequent engine restart request even if engagement of a pinion gear with a ring gear is failed in the process of a stop of the engine can be realized.

DESCRIPTION OF EMBODIMENTS

Hereinafter, an embodiment of a vehicle engine starting apparatus according to the present invention will be described with reference to appended drawings.
[Embodiment]

Figure 1:
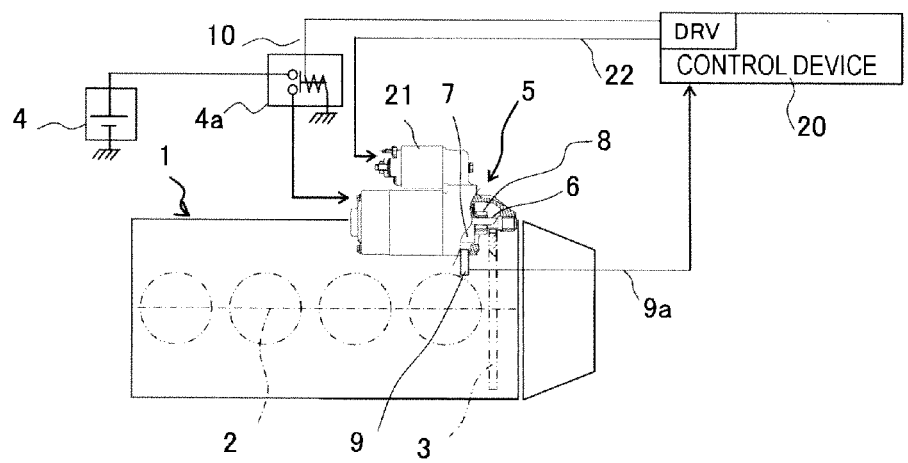
FIG. 1 is an overall configuration diagram of a vehicle engine starting apparatus to which the present invention is applied.

FIG. 1 is a schematic configuration diagram of a vehicle engine starting apparatus according to an embodiment of the present invention. In FIG. 1, a ring gear 3 is attached to a crank shaft 2 of an engine 1. Meanwhile, a pinion gear 8 integrally configured with an one-way clutch 7 is attached to an output shaft 6 of a starter 5 that generates rotational drive force for restarting the engine 1.

This pinion gear 8 is configured to be capable of engagement with/releasing engagement with the ring gear 3, and rotational drive force of a starting motor (motor) as the starter 5 can be transmitted to the engine 1 by the engagement of the pinion gear 8 with the ring gear 3.

Note that the output shaft 6 and the pinion gear 8 are respectively provided with helical splines (not illustrated) that face each other. The rotational drive force of the starter 5 rotates the crank shaft 2 of the engine 1 via the pinion gear 8 and the ring gear 3 by the engagement between the helical splines, so that the engine 1 is started.

Further, a rotation speed/engagement detection sensor 9 of the pinion gear 8 is disposed at the starter 5. Further, to monitor the engine rotation speed, a rotation sensor (not illustrated) may be provided at a periphery of the ring gear 3, or an output from a crank angle sensor (not illustrated) of the engine 1 may be used. The rotation sensor (not illustrated) at the periphery of the ring gear 3 or the output from the crank angle sensor for monitoring the engine rotation speed is connected to a signal wire (not illustrated) to a control device 20 described below.

A vehicle engine starting apparatus, which is the embodiment of the present invention, is provided with the engine 1, the ring gear 3 fixed to the crank shaft 2 of the engine 1, the starter 5 provided with the pinion gear 8 that is engaged with the ring gear 3, a battery 4 that is the power of the starter 5, a relay 4a, the rotation speed/engagement detection sensor 9, and the control device 20.

Further, when the engine 1 for vehicle is automatically restarted after the engine 1 is temporarily automatically stopped, the control device 20 has a function to temporarily stop the engine 1 when a condition is established during driving of the vehicle, the condition allowing the engine 1 to be temporarily stopped, and to rotate the starter 5 to restart the engine 1 when a restart condition is established.

A signal wire 9a for transmitting a signal from the rotation speed/engagement detection sensor 9 is connected to the control device 20. Also, a power wire 10 for supplying the power to the relay 4a and a power wire 22 for supplying the power to a magnet switch 21 are connected to the control device 20 through a drive unit (DRV) of the control device 20. When the magnet switch 21 is driven, a solenoid within the magnet switch 21 is energized, whereby the one-way clutch 7 is displaced toward a direction of the ring gear 3, and the pinion gear 8 is also displaced toward the direction of the ring gear 3 in association with the displacement of the clutch 7. That is, the magnet switch 21 operates as a pinion gear displacement means that causes the pinion gear 8 to move closer to/to separate from the direction of the ring gear 3.

Note that, although the rotation speed detection sensor and the engagement detection sensor are integrally configured as the sensor 9, these sensors can be configured such that each function of the detection of the rotation speed of the pinion gear 8 and the detection of the engagement of the pinion gear 8 with the ring gear 3 may be performed by separate detection means. Also, a semiconductor switch device may be used in place of the relay 4a. Also, the semiconductor switch device may be used for supplying the power to the magnet switch 21.

Figure 2:
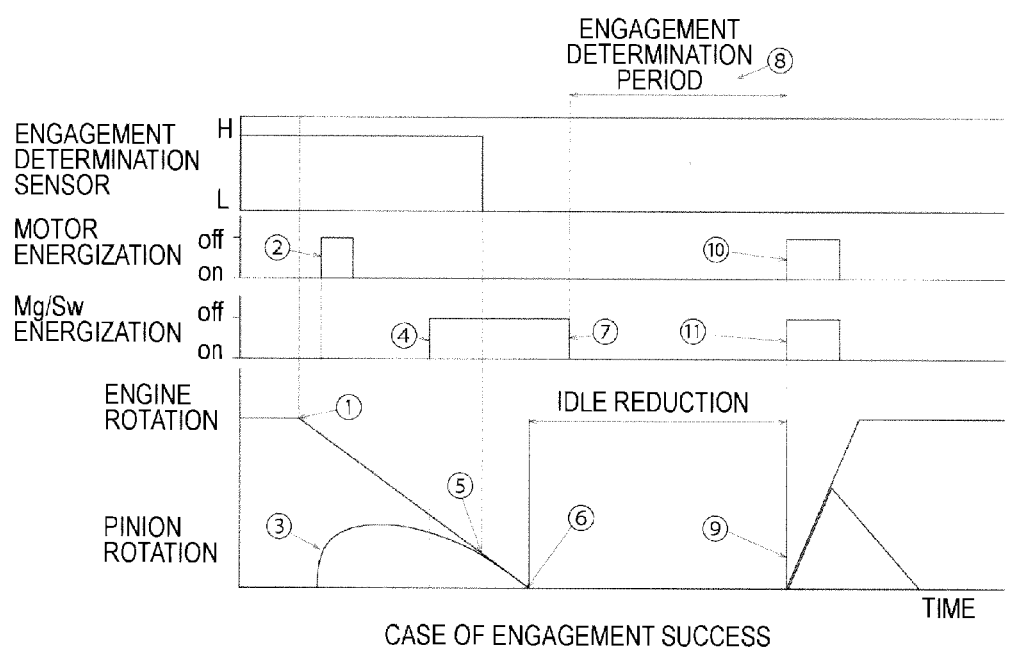
FIG. 2 is an explanatory diagram of an operation when a pinion gear succeeds to be engaged with a ring gear according to an embodiment of the present invention.
Figure 3:
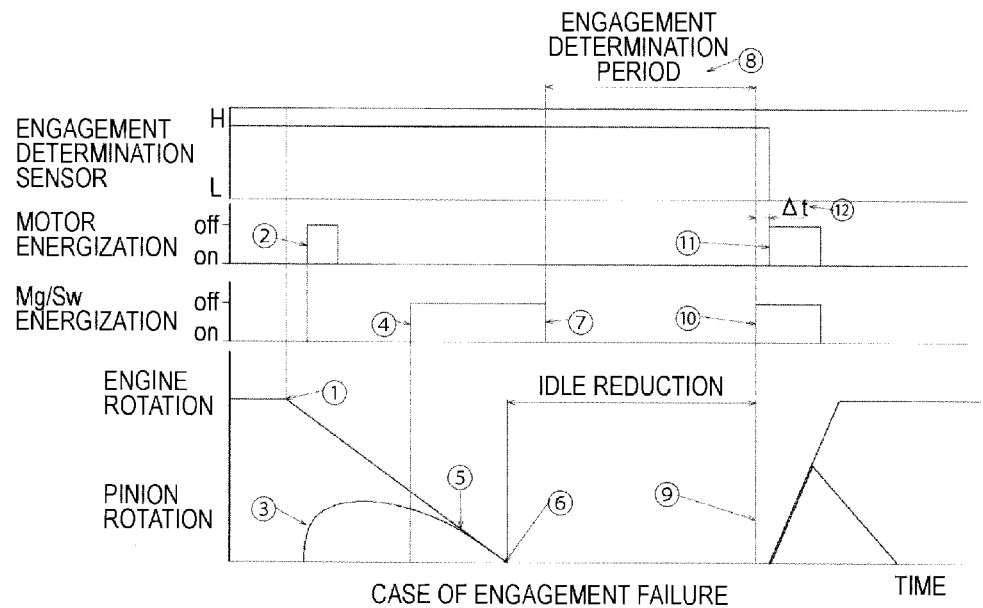
FIG. 3 is an explanatory diagram of an operation when the pinion gear fails to be engaged with the ring gear according to the embodiment of the present invention.

In the above-described configuration, when an engine restart request occurs after the vehicle and the engine 1 are stopped for a certain period, restart in a case where the pinion gear 8 succeeds to be engaged with the ring gear 3 is illustrated in FIG. 2, and restart in a case where the pinion gear 8 fails to be engaged with the ring gear 3 is illustrated in FIG. 3. First, restart in a case where the pinion gear 8 succeeds to be engaged with the ring gear 3 will be described with reference to FIG. 2.

The control device 20 determines a speed of the vehicle and a driving condition during an engine operation, and when a condition of idle reduction of the engine 1 is met, an engine rotation stop operation is started by cutting fuel and the like at the timing illustrated with the circled number 1 of FIG. 2. In the course of a stop of the rotation of the engine 1, when a predetermined condition is met, that is, the engine rotation speed reaches 400 r/min, for example, the relay 4a is turned ON by being operated for a short time with a signal from the control device 20, so that an armature (not illustrated) of a motor of the starter 5 is energized by the battery 4 (at the timing illustrated with the circled number 2 of FIG. 2), and the pinion gear 8 is rotated (illustrated with the circled number 3 of FIG. 2).

The control device 20 monitors the rotation speed of the pinion gear 8 and the engine rotation speed, and drives the magnet switch 21 (illustrated with the circled number 4 of FIG. 2) such that the pinion gear 8 is engaged with the ring gear 3 at a timing when the rotation speed and the engine rotation speed are nearly synchronized with each other (illustrated with the circled number 5 of FIG. 2).

A procedure of the engagement of the pinion gear 8 with the ring gear 3 is completed by a link bar (not illustrated) for pushing the pinion gear 8 toward a ring gear 3 side, and the pinion gear 8 waits a restart request of the engine 1. The energization to the magnet switch 21 at this time is cut off (the circled number 7 of FIG. 2) after the engine 1 is completely stopped (illustrated with the circled number 6 of FIG. 2). In this case, the engagement state between the pinion gear 8 and the ring gear 3 is maintained.

Note that, although the rotation speed of the pinion gear 8 and the engine rotation speed are monitored while rotating the pinion gear 8, and the magnet switch 21 is driven at the timing when the rotation speed and the engine rotation speed are nearly synchronized with each other, only the rotation speed of the engine 1 is monitored without rotating the pinion gear 8, and the magnet switch 21 is driven just before the engine rotation speed is stopped (for example, 50 r/min), and the pinion gear 8 may be engaged with the ring gear 3.

Here, the engagement detection sensor 9 detects whether the engagement of the pinion gear 8 with the ring gear 3 has been succeeded after the energization to the magnet switch 21 is cut off (during a period illustrated with the circled number 8 of FIG. 2). During this period, if the engagement of the pinion gear 8 with the ring gear 3 is succeeded, the one-way clutch 7 integrally configured with the pinion gear 8, which is a detection unit of the engagement detection sensor 9, is displaced toward an axial direction of the clutch 7, and loses the facing relation with the sensor 9, and therefore, an output of the sensor 9 becomes zero ("L" state).

Meanwhile, if the engagement of the pinion gear 8 with the ring gear 3 is failed, the one-way clutch 7 integrally configured with the pinion gear 8 keeps a wrapped state with the engagement detection sensor 9 in the axial direction of the clutch 7 (the facing relation is maintained). Therefore, an output of the engagement detection sensor 9 is set to be kept "high" ("H" state). Note that the output states "H" and "L" of the engagement detection sensor 9 may be set to have a reverse relation to the above description. A technique of detecting whether the pinion gear 8 has been engaged with the ring gear 3 will be described below.

When the output of the engagement detection sensor 9 is zero (illustrated with the circled number 8 of FIG. 2), the control device 20 determines that the engagement of the pinion gear 8 with the ring gear 3 is succeeded, and for example, when restart of the engine 1 is required by, for example, a signal being turned blue (illustrated with the circled number 9 of FIG. 2), the control device 20 outputs a signal to the magnet switch 21 and to the relay 4a simultaneously. Accordingly, the magnet switch 21 is re-driven (illustrated with the circled number 11 of FIG. 2), and the state of the pinion gear 8 being engaged with the ring gear 3 is maintained.

Then, the armature (not illustrated) of the starter 5 is energized by the battery 4 by the relay 4a being operated (the circled number 10 of FIG. 2), and the pinion gear 8 engaged with the ring gear 3 cranks and restarts the engine 1.

Next, restart of a case where the pinion gear 8 fails to be engaged with the ring gear 3 will be described with reference to FIG. 3.

When the engagement sensor 9 has transmitted a signal indicating the engagement failure (the output is not zero, that is, the output is "H") to the control device 20, the control device 20 outputs a drive signal only to the magnet switch 21 to drive the magnet switch 21 (the circled number 10 of FIG. 3), and causes the pinion gear 8 at a stationary position to move toward the ring gear 3 side when restart of the engine is required (the circled number 9 of FIG. 3) by the signal being turned blue, for example.

After the pinion gear 8 is sufficiently displaced toward the ring gear 3 side (after a predetermined time Δt, illustrated with the circled number 12 of FIG. 3), the control device 20 transmits a signal to the relay 4a, so that the relay 4a is driven. Accordingly, the armature (not illustrated) of the starter 5 is energized by the battery 4 (the circled number 11 of FIG. 3), the pinion gear 8 engaged with the ring gear 3 or pushed toward the ring gear 3 side is engaged with the ring gear 3, so that the pinion gear 8 is rotated and driven to crank and restart the engine 1.

Note that, since the cases of the engagement success and the engagement failure between the pinion gear 8 and the ring gear 3 have the same processes from the engine stop (the circled number 1 of FIG. 2 and the circled number 1 of FIG. 3) to the cut off of the energization to the magnet switch 21 (the circled number 7 of FIG. 2 and the circled number 7 of FIG. 3), description of the processes from the engine stop at the engagement failure (the circled number 1 of FIG. 3) to the cut off of the energization to the magnet switch 21 (the circled number 7 of FIG. 3) is omitted.

Among the above processes, a control method after the cut off of the energization to the magnet switch 21 (the circled number 7 of FIG. 2 and the circled number 7 of FIG. 3) will be described with reference to a flowchart of FIG. 4.

Figure 4:
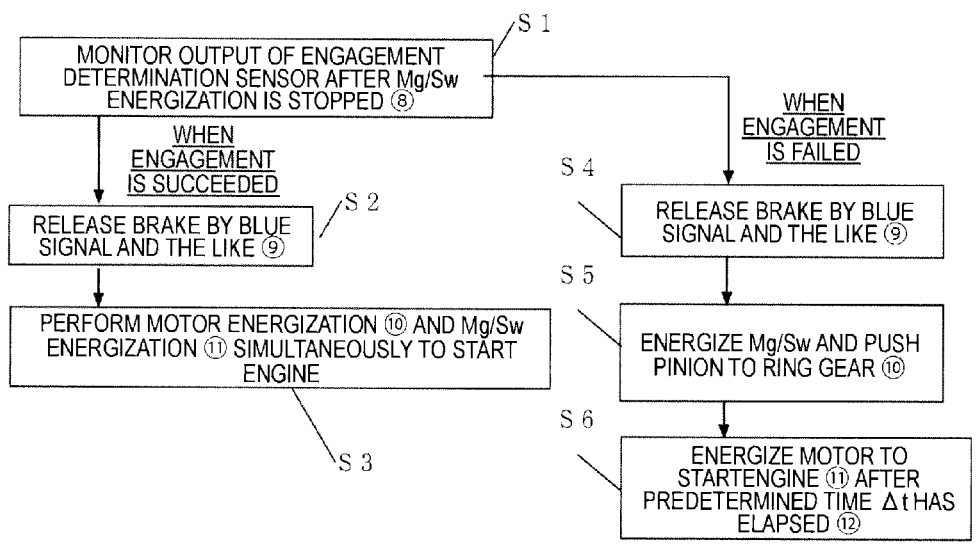
FIG. 4 is a schematic flowchart of an engine start operation according to the embodiment of the present invention.

In step S1 of FIG. 4, the control device 20 monitors an output of the engagement determination sensor 9 after the energization to the magnet switch 21 is stopped (corresponding to a period illustrated with the circled number 8 in FIGS. 2 and 3). Then, when the engagement is succeeded, that is, an output signal of the engagement sensor 9 is zero ("L"), the process proceeds to step S2, and the control device 20 releases a brake of the vehicle (corresponding to the circled number 9 of FIG. 2). Following that, in step S3, the control device 20 conducts energization to the motor of the starter 5 and to the magnet switch 21 simultaneously to start the engine 1.

In step S1, when the engagement of the pinion gear 8 with ring gear 3 is failed, that is, when an output signal of the engagement sensor 9 is high ("H"), the process proceeds to step S4, and the control device 20 releases the brake of the vehicle (corresponding to the circled number 9 of FIG. 3). Following that, in step S5, the control device 20 conducts energization to the magnet switch 21 to cause the pinion gear 8 to move toward the direction of the ring gear 3 (corresponding to the circled number 10 of FIG. 3). Then, the process proceeds to step S6, and the control device 20 conducts energization to the motor of the starter 5 simultaneously after a predetermined time Δt has elapsed (corresponding to a period illustrated with the circled number 12 of FIG. 3) to start the engine 1 (corresponding to the circled number 11 of FIG. 3).

In a case where the control method according to the embodiment of the present invention is not performed, if the engagement of the pinion gear 8 with the ring gear 3 has been failed although things go well if succeeded, the pinion gear 8 starts the rotation before it reaches the ring gear 3 when the magnet switch 21 and the relay 4a are simultaneously driven in order to quickly restart the engine.

Therefore, the engagement of the pinion gear 8 with the ring gear 3 becomes difficult, and in many cases, not only the engine cannot be started due to the failure of the engagement, but also the pinion gear 8 continues the rotation on an end face of the ring gear 3, and this causes large noise.

In the case where the control method of the present invention is not employed, to prevent incapability of restarting the engine and generation of the large noise, regardless of success or failure of the engagement of the pinion gear 8 with the ring gear 3, it is necessary to drive the magnet switch 21 first, and to drive the relay 4a after a predetermined time Δt has elapsed in restarting the engine. In this case, restart of the engine is always delayed by the predetermined time Δt, and the engine cannot be quickly restarted even in a case where the engagement of the pinion gear 8 with the ring gear 3 is succeeded.

Next, a case will be described with reference to FIG. 5, where a restart request occurs during a drop of the engine rotation in the process of a stop of the engine.

The control device 20 determines the speed of the vehicle and the driving condition. When a condition of idle reduction of the engine 1 is met, the control device 20 starts a stop operation of the engine 1 by cutting the fuel and the like, as illustrated with the circled number 1 of FIG. 5. In the course of a stop of the engine 1, when a predetermined condition is met, for example, when the engine rotation reaches 400 r/min, the control device operates the relay 4a for a short period to energize the armature (not illustrated) of the motor of the starter 5 from the battery 4 (illustrated with the circled number 2 of FIG. 5), and rotates the pinion gear 8 (illustrated with the circled number 3 of FIG. 5).

Figure 5:
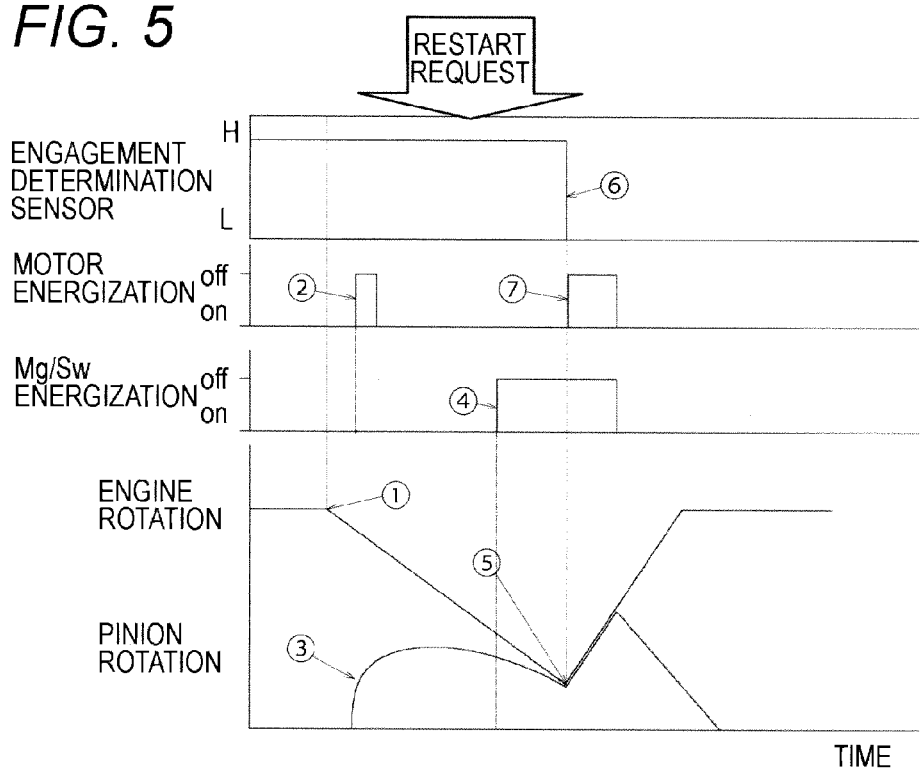
FIG. 5 is an explanatory diagram of an operation when an engine restart command occurs during an effect of an engine rotation speed is shown according to the embodiment of the present invention.

The control device 20 monitors the rotation speed of the pinion gear 8 and the rotation speed of the engine 1, and drives the magnet switch 21 (illustrated with the circled number 4 of FIG. 5) such that the pinion gear 8 is engaged with the ring gear 3 at a timing when the rotation speeds of the pinion gear 8 and the engine 1 are nearly synchronized with each other (illustrated with the circled number 5 of FIG. 5). Then, the procedure of the engagement of the pinion gear 8 with the ring gear 3 is completed by a link bar (not illustrated) for pushing the pinion gear 8 toward the ring gear 3 side.

In the above-described series of the processes, when a restart request of the engine 1 occurs in the process of the stop operation of the engine rotation, the control device 20 monitors an output from the engagement detection sensor 9, and operates the relay 4a after the output of the engagement detection sensor 9 becomes zero (the circled number 6 of FIG. 5) because of the engagement of the pinion gear 8 with the ring gear 3. When the output of the engagement detection sensor 9 is the high "H" state, the control device 20 does not operate the relay 4a since the pinion gear 8 is not engaged with the ring gear 3.

Accordingly, the armature (not illustrated) of the motor of the starter 5 is energized by the battery 4 (the circled number 7 of FIG. 5), the pinion gear 8 engaged with the ring gear 3 cranks the engine 1, so that the engine 1 is restarted.

Note that, in the embodiment of the present invention, regardless of the presence of a restart request of the engine 1, when the rotation speed of the engine 1 reaches 400 r/min, the armature of the motor of the starter 5 is energized, and the pinion gear 8 is rotated. However, the energization to the armature may be conducted by other method.

For example, during a drop of the engine rotation in the process of a stop of the engine rotation of the engine 1, the armature of the motor of the starter 5 may be energized to rotate the pinion gear 8 after a restart request occurs, or the armature of the motor of the starter 5 may be energized after the pinion gear 8 is engaged with the ring gear 3 without rotating the pinion gear 8.

By using the engine starting apparatus according to the embodiment of the present invention, when an engine restart request occurs after the vehicle and the engine are stopped for a certain period, restart of the engine can be more quickly performed without waiting the predetermined time Δt when the engagement is succeeded using a detection result of the engagement of the pinion gear 8 with the ring gear 3. Also, when the engagement is failed, the pinion gear 8 is displaced toward the ring gear 3 side first, and the starter 5 generates the rotational drive force after the engagement is succeeded. Therefore, the engine 1 can be reliably restarted.

Also, even if a restart request occurs during a drop of the engine rotation in the process of a stop of the engine, the armature of the motor of the starter 5 is energized after the pinion gear 8 is engaged with the ring gear 3. Therefore, the engine can be quickly and reliably restarted.

Figure 6:
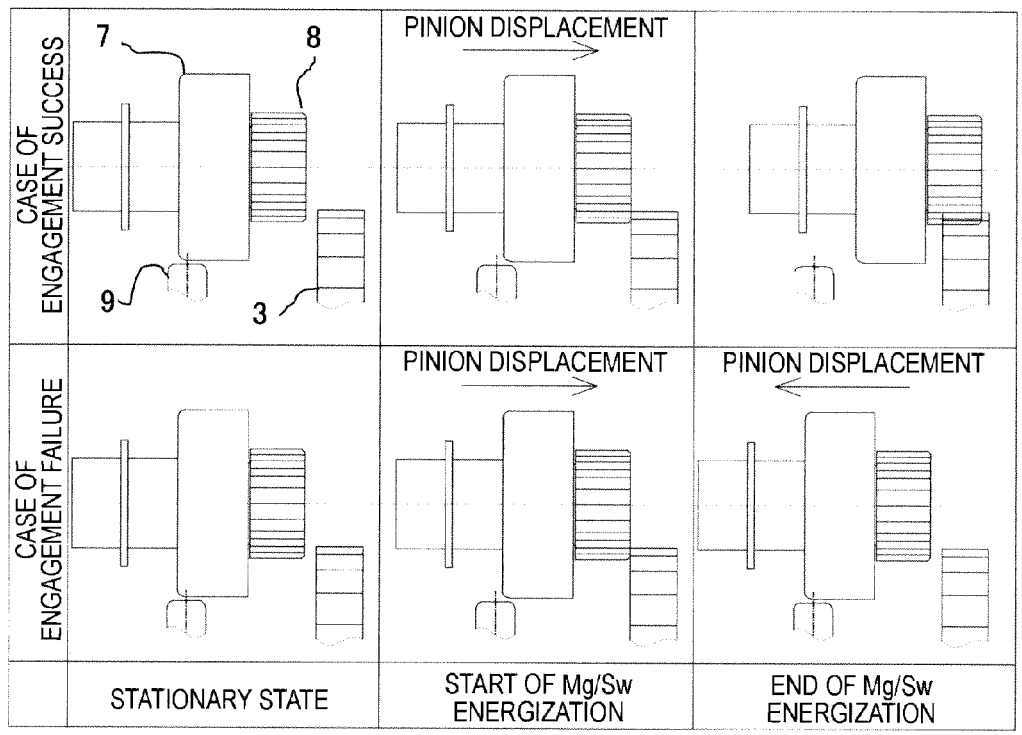
FIG. 6 is an explanatory diagram of a technique of detecting the engagement of the pinion gear with the ring gear according to the embodiment of the present invention.

Next, an example of a technique of detecting whether the pinion gear 8 has been engaged with the ring gear 3 will be described with reference to FIG. 6.

The engagement detection sensor 9 in the embodiment of the present invention is a magnetic type sensor, and is arranged such that, in the stationary state where the pinion gear 8 is not engaged with the ring gear 3, the one-way clutch 7 integrally configured with the pinion gear 8 and the engagement detection sensor 9 face each other, and a position of the one-way clutch 7 in the axial direction is nearly aligned with the engagement detection sensor 9.

Where the pinion gear 8 is displaced in the direction of the ring gear 3, and is engaged with the ring gear 3, the engagement detection sensor 9 is in a stationary state. Therefore, the engagement detection sensor 9 does not face the clutch 7, and the position of the engagement detection sensor 9 and the position of the one-way clutch 7 in the axial direction are different from each other.

By arranging the pinion gear 8 and the engagement detection sensor 9 in the above-described arrangement, when the pinion gear 8 is positioned in the stationary position where it faces the clutch 7 after cut off of the energization to the magnet switch 21, illustrated with the circled number 7 of FIG. 2 and the circled number 7 of FIG. 3, an output of the engagement detection sensor 9 becomes "H".

In contrast, where the pinion gear 8 is engaged with the ring gear, the engagement sensor 9 does not output an output, and the output state is "L".

Therefore, whether the pinion gear 8 has been engaged with the ring gear 3 can be determined by determining whether the output of the engagement detection sensor 9 is "H" or "L".

As described above, according to an embodiment of the present invention, a vehicle engine starting apparatus capable of automatically performing restart of an engine by quickly responding to a subsequent engine restart request can be realized even if engagement of a pinion gear with a rig gear is failed in the process of a stop of the engine.

Note that, in the above-described embodiment, a magnetic sensor is used as the engagement detection sensor 9. However, a light reflection type sensor, a light permeable type sensor, or other sensor may be used.

REFERENCE SIGNS LIST 1 engine
2 crank shaft
3 ring gear
4 battery
4a relay
5 starter
6 output shaft of starter
7 one-way clutch
8 pinion gear
9 rotation speed/engagement detection sensor
10 and 22 power wire
20 control device
21 magnet switch

The invention claimed is:
1. A vehicle engine starting apparatus in which a pinion gear mounted to a starter motor is detatchably engaged with a ring gear of a crank shaft of an engine, and the starting motor rotates the pinion gear to start the engine, the vehicle engine starting apparatus comprising:
   a pinion gear displacement means configured to cause the pinion gear to move closer to and to separate from the ring gear;
   a means configured to energize an armature of the starting motor to rotate the starting motor;
   an engagement detection means configured to detect whether the pinion gear has been engaged with the ring gear; and a control means configured to control operations of the pinion gear displacement means and the starter motor based on an engagement detection signal from the engagement detection means, wherein the pinion gear displacement means and the means to rotate the starting motor are controllable independently of each other, the control means monitors an engaged state of the pinion gear with the ring gear by the engagement detection means until an engine restart request occurs after the pinion gear is engaged with the ring gear during a drop of an engine rotation speed in a process of a stop operation of the engine, and when the engine restart request occurs, the control means controls the pinion gear displacement means and the means configured to rotate the starting motor to be driven simultaneously when the control means determines that the pinion gear is engaged with the ring gear based on the engagement detection signal from the engagement detection means, and controls the pinion gear displacement means and the means configured to rotate the starting motor such that the starting motor is driven after the pinion gear displacement means is driven when the control means determines that the pinion gear is not engaged with the ring gear based on the engagement detection signal from the engagement detection means.

2. The vehicle engine starting apparatus according to claim 1, comprising:

a rotation speed detection means of the pinion gear, wherein the control means controls the operation of the pinion gear displacement means based on a rotation speed of the pinion gear detected by the rotation speed detection means of the pinion gear and a rotation speed of the engine.

3. The vehicle engine starting apparatus according to claim 2, wherein the engagement detection means is integrally formed with the rotation speed detection means of the pinion gear.

4. The vehicle engine starting apparatus according to claim 1, wherein when an engine restart request occurs during a drop of the engine rotation speed in a process of a stop of the engine, the control means rotates the pinion gear to start the engine after causing the pinion gear to move toward the ring gear by the pinion gear displacement means and to be engaged with the ring gear when the control means has determined that the pinion gear is not engaged with the ring gear based on the engagement detection signal from the engagement detection means.

5. The vehicle engine starting apparatus according to claim 1, wherein the engagement detection means detects a displaced position of the pinion gear displacement means, and detects whether the pinion gear has been engaged with the ring gear.

6. The vehicle engine starting apparatus according to claim 5, wherein the pinion gear displacement means includes a one-way clutch for rotating the pinion gear, and the engagement detection means is arranged at a position facing the one-way clutch at a position where the pinion gear is not engaged with the ring gear, and not facing the one-way clutch at a position where the pinion gear is engaged with the ring gear, and the engagement detection means detects whether the pinion gear has been engaged with the ring gear according to whether the engagement detection means faces the one-way clutch.

7. The vehicle engine starting apparatus according to claim 6, wherein the engagement detection means is integrally formed with the rotation speed detection means configured to detect the rotation speed of the pinion gear.

* * * * *